(12) United States Patent
Desmoulins

(10) Patent No.: US 6,565,293 B2
(45) Date of Patent: May 20, 2003

(54) PNEUMATIC MACHINE TOOL

(75) Inventor: Marcel Desmoulins, Mortcerf (FR)

(73) Assignee: Recoules S.A., Ozoir la Ferriere (FR)

( * ) Notice: Subject to any disclaimer, the term of this patent is extended or adjusted under 35 U.S.C. 154(b) by 122 days.

(21) Appl. No.: 09/782,313

(22) Filed: Feb. 14, 2001

(65) Prior Publication Data

US 2001/0010783 A1 Aug. 2, 2001

(51) Int. Cl.$^7$ ............................................. B23B 47/24
(52) U.S. Cl. ........................ 408/10; 408/124; 408/138
(58) Field of Search ................................. 408/6, 10, 11, 408/17, 124, 138, 141

(56) References Cited

U.S. PATENT DOCUMENTS

| | | | | |
|---|---|---|---|---|
| 2,978,689 A | * | 4/1961 | Tech et al. | 408/11 |
| 3,244,029 A | * | 4/1966 | Jacobson | 408/10 |
| 3,571,834 A | * | 3/1971 | Mathias | 408/11 |
| 4,310,269 A | * | 1/1982 | Neu et al. | 408/10 |
| 4,688,970 A | * | 8/1987 | Eckman | 408/10 |
| 4,738,438 A | | 4/1988 | Horie et al. | |
| 4,822,215 A | * | 4/1989 | Alexander | 318/433 |
| 4,854,786 A | * | 8/1989 | Alexander et al. | 408/1 R |
| 5,042,309 A | * | 8/1991 | Kitamura | 408/11 |

FOREIGN PATENT DOCUMENTS

| | | | | |
|---|---|---|---|---|
| DE | 3828550 A1 | * | 3/1990 | 408/11 |
| DE | 43 14 147 | | 12/1993 | |
| JP | 55879 A | * | 5/1979 | 408/11 |
| JP | 34602 A | * | 2/1989 | 408/11 |
| JP | 34632 A | * | 2/1989 | 408/11 |
| JP | 64747 A | * | 3/1989 | 408/11 |

* cited by examiner

Primary Examiner—Daniel W. Howell
(74) Attorney, Agent, or Firm—Young & Thompson

(57) ABSTRACT

A pneumatic machine tool includes a telescopic spindle having a drive shaft driven in rotation by a pneumatic motor. A hollow shaft is slidingly mounted on the drive shaft. A tool holder is associated with the hollow shaft and is driven in translation by a control device. The control device includes a carriage driven in translation by an endless screw via a nut carried by the carriage. The endless screw is driven in rotation by an electric motor. The character is provided with a force sensor designed to measure the thrust exerted on the tool holder and connected to a central processing unit in which is stored an algorithm for processing the signal delivered by the sensor and for monitoring the advance of the tool carried by the spindle.

9 Claims, 3 Drawing Sheets

PNEUMATIC MACHINE TOOL

BACKGROUND OF THE INVENTION

The present invention relates to a pneumatic machine tool particularly suited to use in the aeronautical industry.

Pneumatic machines are widespread and often preferred over electrically driven machines because of their performance.

The prior art already teaches a pneumatic machine tool of the type comprising a telescopic tool-holder spindle comprising a drive shaft driven in rotation by a pneumatic motor and on which is slidingly mounted a hollow shaft with which a tool holder is associated and which is driven in translation by a control means comprising a carriage driven in translation by an endless screw via a nut carried by the carriage, the said endless screw being driven in rotation by an electric motor.

This type of machine tool is often fitted with a ring allowing the machine tool to be locked to a machining rack.

Once the machine tool has been mounted on this rack, a central processing unit with which the machine tool is equipped actuates the electric motor so as to begin a phase of bringing the tool quickly up into contact with the workpiece that is to be machined.

This phase continues in the form of a machining phase proper. Finally, after machining, the cycle is finished.

To date, there are various techniques that enable the end of machining to be detected.

In particular, detection of drilling may be achieved by measuring the strength of the current drawn by the electric motor. This technique is ineffective in certain instances in so far as it cannot be used when the electric motor is a motor of the stepping type.

It is also possible to detect the end of drilling of the workpiece by detecting an increase in the rotational speed of the drive shaft of the machine tool. This technique has a certain number of drawbacks particularly as a result of the fact that it is unable to supply precise information in so far as the rotational speed of the shaft varies according to a great many parameters, for example according to the amount of lubricant on the workpiece.

The object of the invention is to alleviate the drawbacks of the state of the art.

SUMMARY OF THE INVENTION

The subject of the invention is therefore a pneumatic machine tool comprising a telescopic spindle having a drive shaft driven in rotation by a pneumatic motor and on which is slidingly mounted a hollow shaft with which a tool holder is associated and which is driven in translation by control means comprising a carriage driven in translation by an endless screw via a nut carried by the carriage, the said endless screw being driven in rotation by an electric motor, characterized in that the carriage is provided with a force sensor designed to measure the thrust exerted on the tool holder and connected to a central processing unit in which is stored an algorithm for processing the signal delivered by the sensor and for monitoring the advance of the tool carried by the spindle.

The pneumatic machine tool according to the invention may furthermore have one or more of the following features, taken in isolation or in any technically feasible combination:

the processing algorithm comprises software means for calculating the difference between the signal delivered by the sensor and a thrust threshold value corresponding to a minimum value for the thrust exerted during the machining of a workpiece, the calculation means constitute means of detecting the progress of the drilling of a workpiece in the course of machining, the electric motor is an electric stepping motor, the machine tool further comprising a counter for measuring the axial displacement of the tool and the central processing unit controlling the stopping of a machining cycle in response to detection of the end of drilling as soon as, after drilling, the tool has advanced by a predetermined distance, the sensor is mounted between a member for immobilizing the nut on the carriage and the nut, the sensor is incorporated into a member for holding the nut on the carriage, the sensor is mounted between a holding member and the carriage, the sensor consists of a strain gauge, the sensor consists of a piezoelectric sensor, the sensor is mounted in a Wheatstone bridge.

BRIEF DESCRIPTION OF THE DRAWINGS

Other features and advantages will emerge from the following description given merely by way of example and made with reference to the appended drawings in which.

DETAILED DESCRIPTION OF THE PREFERRED EMBODIMENTS

Figure 1:
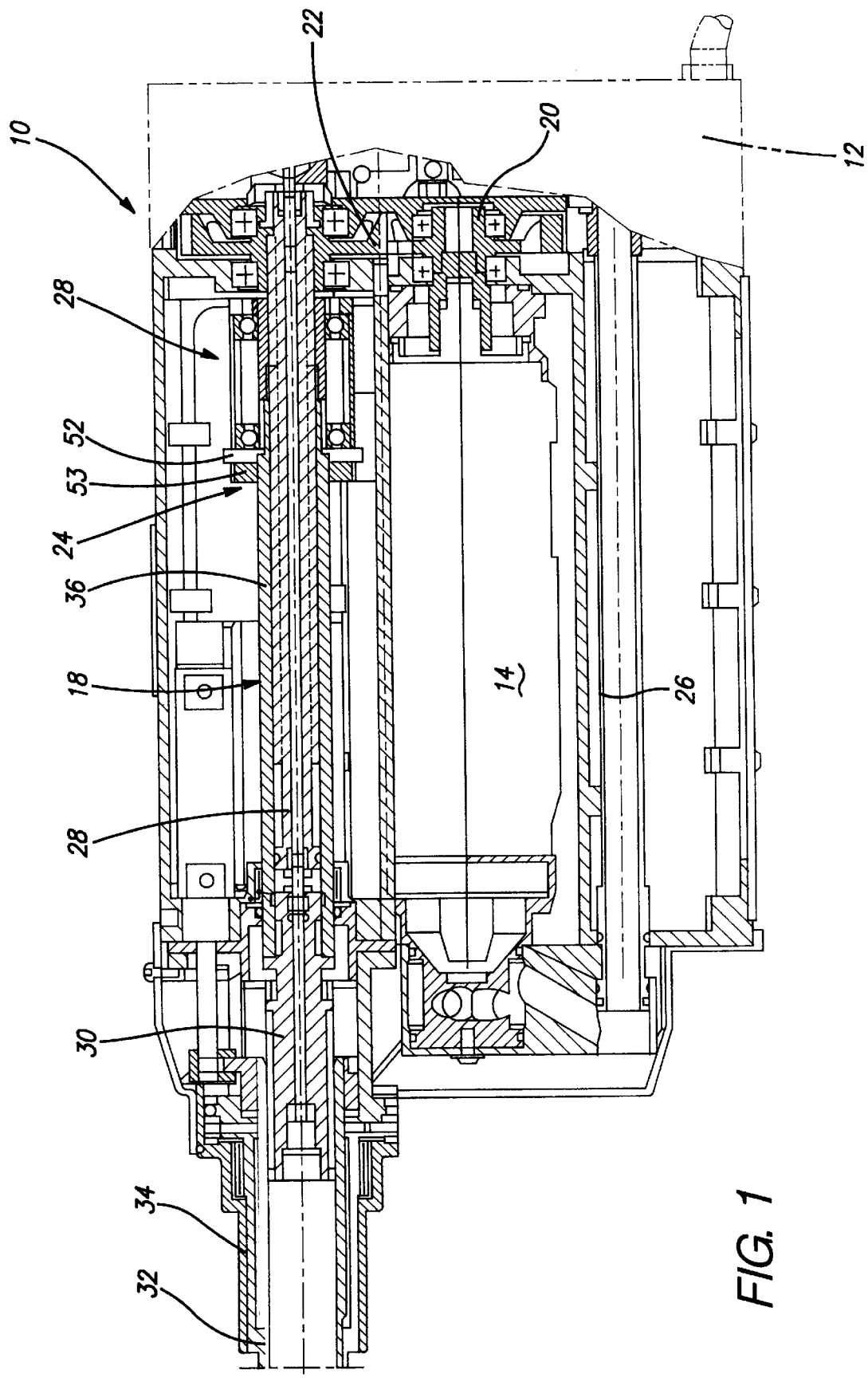
FIG. 1 is a partial cross-sectional view of a machine tool according to the invention.

FIG. 1 depicts a sectional view of a pneumatic machine tool according to the invention and denoted by the overall numerical reference 10.

The machine tool 10 comprises, placed inside a housing 12: a pneumatic motor 14 supplied with compressed air and connected to an appropriate supply source; a telescopic tool-holder spindle 18; and means 24 for controlling the axial extension of the tool-holder spindle 18.

The pneumatic motor 14 and the means for controlling the axial extension of the spindle 18 are connected to a central processing unit (not visible in this figure) placed on an integrated circuit board 26 and in which one or more machine-control algorithms are stored, in the conventional way.

The telescopic spindle 18 comprises a drive shaft 28 fixed in terms of axial translation and driven in rotation via a set of gears 20 and 22 by the pneumatic motor 14, and a hollow shaft 36 with which is associated a tool holder 30 provided with means allowing the fitting of a machining tool (not depicted) and mounted so that it can move in terms of rotation and in terms of translation.

The axial displacement of the hollow shaft 36 and of the tool holder 30 is controlled by the control means 24.

Furthermore, and as is conventional, the machine tool 10 is provided with a sensor bushing 32 associated with a pneumatic round to transmit precise information as to the position of the tool with respect to the workpiece to be machined, this information being transmitted to the central processing unit so as to allow the machine tool to correct the displacement of the hollow shaft 36 and of the tool holder 30 accordingly.

The sensor bushing 32 is surrounded by a ring 34 for locking the machine tool onto a machining rack.

Figure 2:
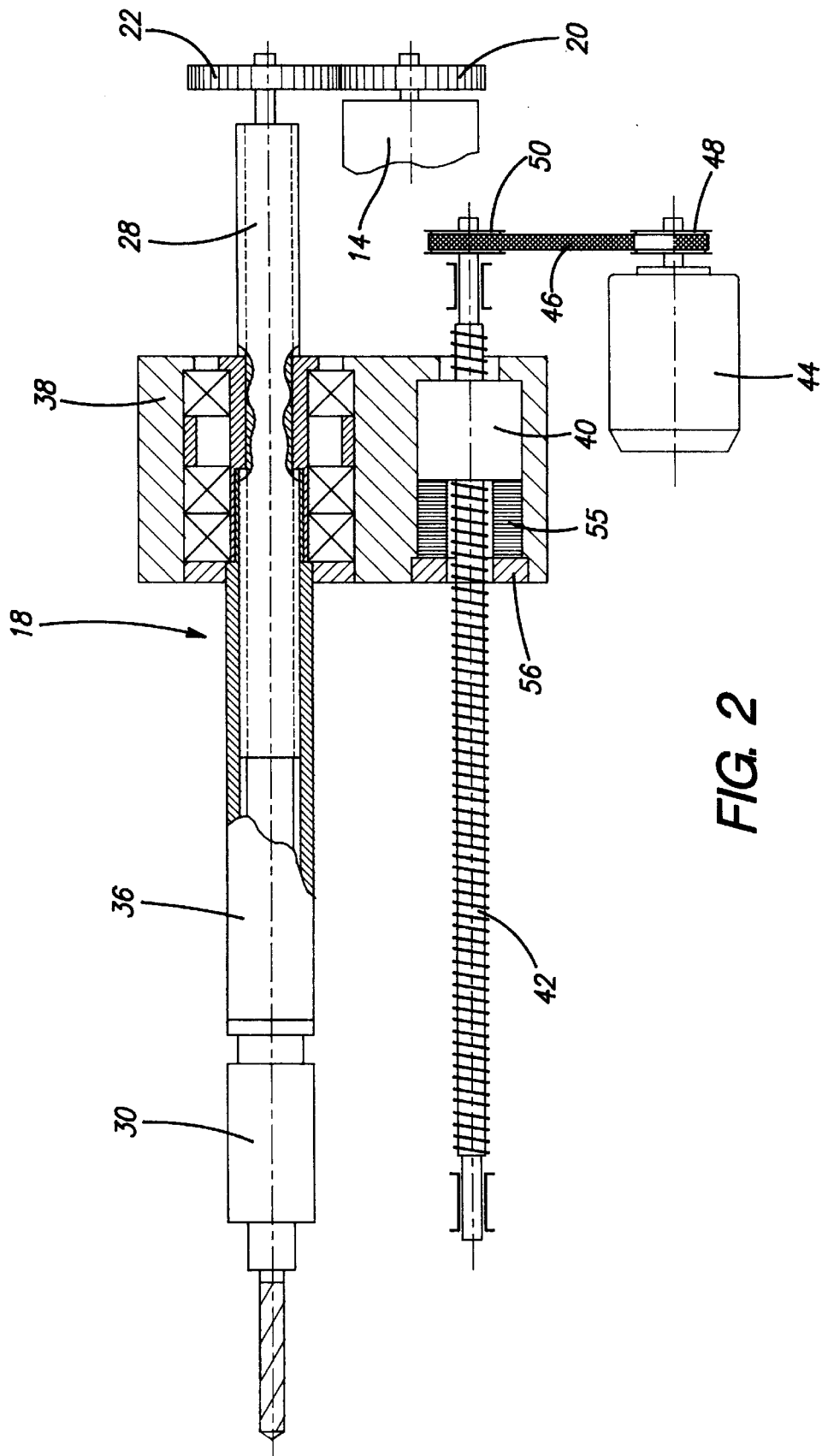
FIG. 2 is a schematic partial view of an alternative form of the machine tool of FIG. 1.

The means for controlling the axial extension of the tool-holder spindle 18 comprise the hollow shaft 36 and a carriage 38 provided with a recirculating-roller nut visible in FIG. 2.

The shaft 36 is driven in translation by the carriage 38, the nut 40 of which has passing through it an endless screw 42 driven in rotation by an electric motor 44, such as a stepping motor for example, via a belt 46 and pulleys 48, 50. The electric motor 44 is controlled by the central processing unit.

As can be seen in FIG. 1, the proximal end of the tool holder 30 translates as one with the shaft 36.

Thus, and as will be appreciated, rotating the endless screw 42 causes, under the action of the recirculating-roller nut 40, a consecutive displacement in translation of the shaft 36 and therefore causes the tool holder 30 to advance.

In order to monitor the advance of the tool holder 30 of the tool-holder spindle 18, the machine tool 10 comprises, incorporated into the carriage 38, a force sensor designed to measure the thrusting force exerted on the telescopic spindle 18 and, in particular, on the tool holder 30.

The force sensor is connected to the central processing unit in such a way as to supply the latter with a signal measuring the force exerted.

The force sensor preferably consists of a strain gauge, so as to provide a relatively precise indication of the force exerted and to do so at low cost.

It will, however, be appreciated that if there is a desire to obtain greater accuracy, the strain gauge may be replaced by a piezoelectric sensor.

As can be seen in FIG. 1, a force sensor 52 is inserted, for example, between a holding member 53 and the carriage 38.

In the embodiment of FIG. 2, a force sensor 55 is located between the nut 40 carried by the carriage 38 and a member 56 for immobilizing the nut on the carriage 38.

More specifically, the force sensor 52 is mounted in a Wheatstone bridge of the conventional type (not depicted) and thus supplies the central processing unit with a voltage that is indicative of the force exerted on the telescopic spindle 18 and on the tool holder 30.

The electric motor 44 driving the endless screw 42 in rotation (FIG. 2) consists of an electric stepping motor.

It is associated with a counter which increments up on each rotation of the endless screw 42, thus giving an indication as to the axial displacement of the tool.

For example, for drilling, the rate of advance of the tool is linear and varies between 0 and 700 mm/min.

This makes it possible to provide an exact indication of the depth of the drilling and for this to be constantly monitored. It is thus possible to advance more quickly or more slowly in a given material, to carry out clearing cycles, and to perform isolated operations of extracting the spindle without rotation, etc.

Figure 3:
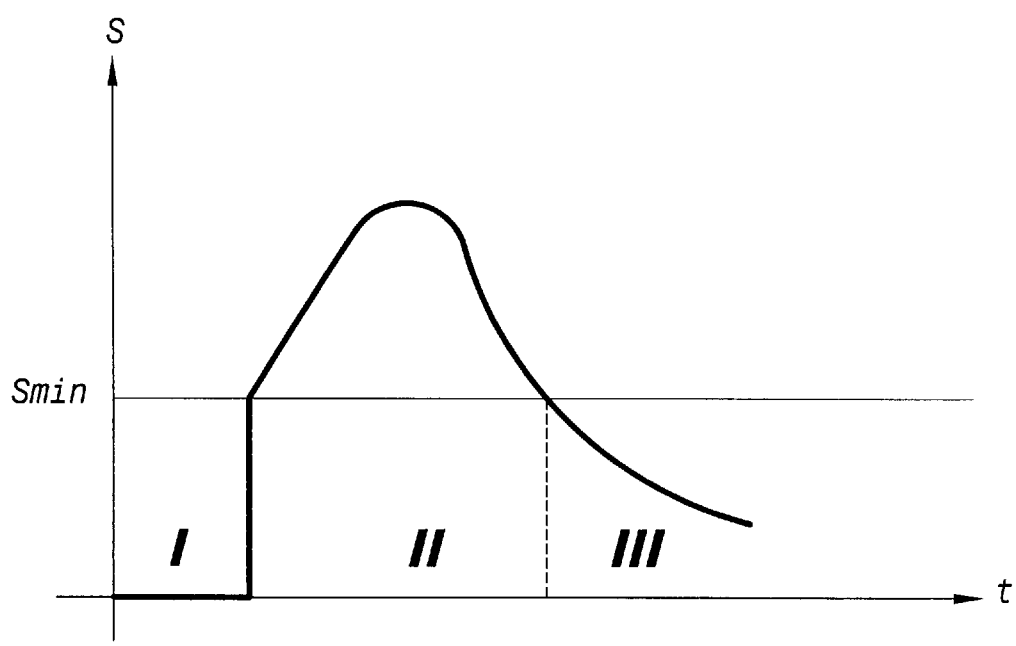
FIG. 3 illustrates the variation of the signal delivered by the force sensor as a function of time.

The technique employed within the machine tool which has just been described will now be explained with reference to FIG. 3, in the case of the drilling of a workpiece.

First of all, during a first phase I, the electric stepping motor 44 is activated so as to carry out a phase of quickly bringing it up to the workpiece that is to be drilled, without engaging with it.

During this phase I, the signal S delivered by the force sensor 52 or 55 is practically zero At the end of this initial phase I, the subsequent phase II corresponds to actually machining the workpiece.

It will be noted that this phase begins when the signal S delivered by the sensor 52 or 55 exceeds a threshold value $S_{min}$ which corresponds to a minimum value of thrust exerted during machining of a workpiece.

For example, this value $S_{min}$ corresponds to a force of 20 kg for the drilling of an orifice of 7 mm diameter.

It will be noted that as soon as the signal S exceeds this threshold value $S_{min}$, indicating that the machine tool is in working advance mode, the central processing unit proceeds with actually processing the signal S so as to monitor the advance of the tool.

More specifically, to detect the end of the drilling of the workpiece, the central processing unit detects the instant at which the signal S once again drops below this value $S_{min}$, which corresponds to the end of the drilling of the workpiece.

As soon as the end of the drilling has been detected, the central processing unit reads the count value off the counter then stops the machining cycle as soon as, after drilling, the tool has advanced by a predetermined distance, for example by 10 mm.

It will be appreciated that the invention which has just been described and which, for monitoring the advance of the tool, uses a force sensor associated with a nut used to advance the tool, makes it possible to provide a precise indication of the end of machining of a workpiece and therefore to optimize a machining cycle for an initial displacement value.

It will finally be noted that the invention is not restricted to the embodiment described.

Indeed, in the machine tool described with reference to FIG. 2, the force sensor is inserted between the member for holding the nut in the carriage and the nut.

As a variant, it could also be incorporated into the holding member itself.

What is claimed is:

1. Pneumatic machine tool comprising:

a telescopic spindle having a drive shaft driven in rotation by a pneumatic motor and on which is slidingly mounted a hollow shaft with which a tool holder is associated and which is driven in translation by control means comprising a carriage driven in translation by an endless screw via a nut carried by the carriage, the said endless screw being driven in rotation by an electric motor, wherein the carriage is provided with a force sensor designed to measure the thrust exerted on the tool holder and connected to a central processing unit in which is stored an algorithm for processing the signal delivered by the sensor and for monitoring the advance of the tool carried by the spindle, and wherein the processing algorithm comprises software means for calculating the difference between the signal delivered by the sensor and a thrust threshold value corresponding to a minimum value for the thrust exerted during the machining of a workpiece so as to determine the end of drilling, the electric motor comprises a counter for measuring the axial displacement of the tool, the counter being connected to the central processing unit, the central processing unit comprising means for controlling the stopping of a machining cycle as soon as, after the determination of the end of drilling, the tool has advanced by a predetermined distance.

2. Machine tool according to claim 1, wherein the sensor is mounted between a member for immobilizing the nut on the carriage and the nut.

3. Machine tool according to claim 1, wherein the sensor is incorporated into a member for holding the nut on the carriage.

4. Machine tool according to claim 1, wherein the sensor is mounted between the carriage and a member for holding the sensor on the carriage.

5. Machine tool according to claim 1, wherein the sensor consists of a strain gauge.

6. Machine tool according to claim 1, wherein the sensor consists of a piezoelectric sensor.

7. Machine tool according to claim 1, wherein the sensor is mounted in a Wheatstone bridge.

8. Pneumatic machine tool comprising a telescopic spindle having a drive shaft driven in rotation by a pneumatic motor and on which is slidingly mounted a hollow shaft with which a tool holder is associated and which is driven in translation by control means comprising a carriage driven in translation by an endless screw via a nut carried by the carriage, the endless screw being driven in rotation by an electric motor, wherein the carriage is provided with a force sensor designed to measure the thrust exerted on the tool holder and connected to a central processing unit in which is stored an algorithm for processing the signal delivered by the sensor and for monitoring the advance of the tool carried by the spindle, wherein the sensor is mounted between a member for immobilizing the nut on the carriage and the nut.

9. Pneumatic machine tool comprising a telescopic spindle having a drive shaft driven in rotation by a pneumatic motor and on which is slidingly mounted a hollow shaft with which a tool holder is associated and which is driven in translation by control means comprising a carriage driven in translation by an endless screw via a nut carried by the carriage, the endless screw being driven in rotation by an electric motor, wherein the carriage is provided with a force sensor designed to measure the thrust exerted on the tool holder and connected to a central processing unit in which is stored an algorithm for processing the signal delivered by the sensor and for monitoring the advance of the tool carried by the spindle, wherein the sensor is incorporated into a member for holding the nut on the carriage.

* * * * *